Oct. 15, 1935.  J H. S. PARKER  2,017,160
LIGHT TIGHT FILM PACKAGE FOR CAMERAS
Filed Oct. 11, 1933
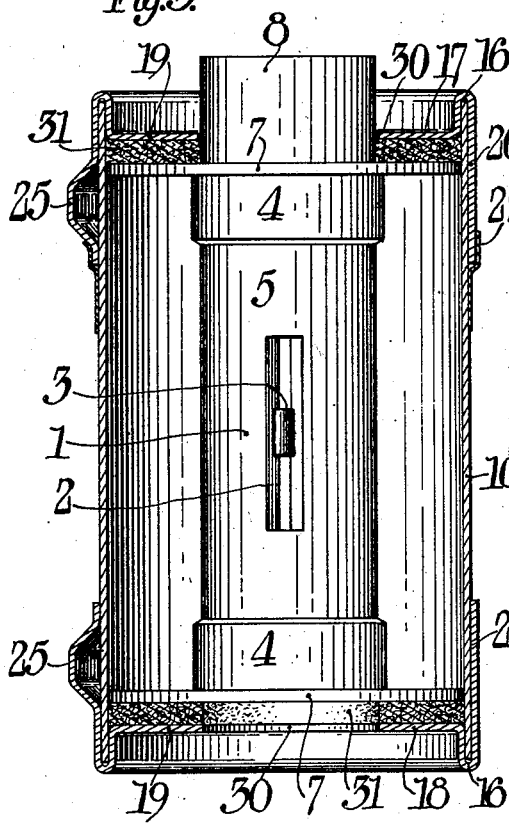
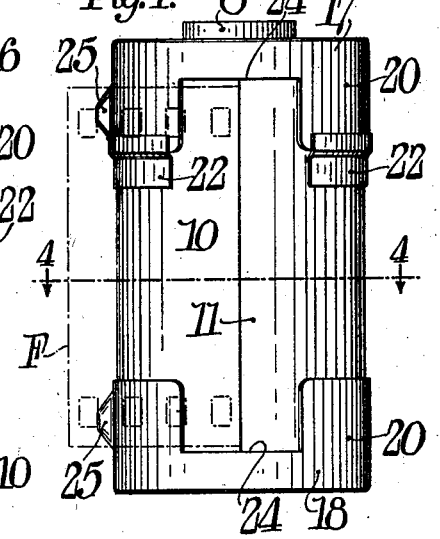
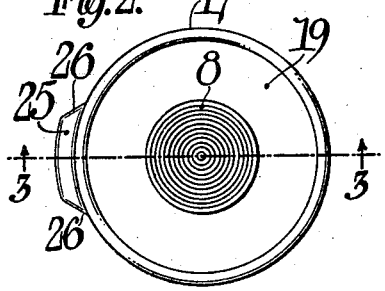
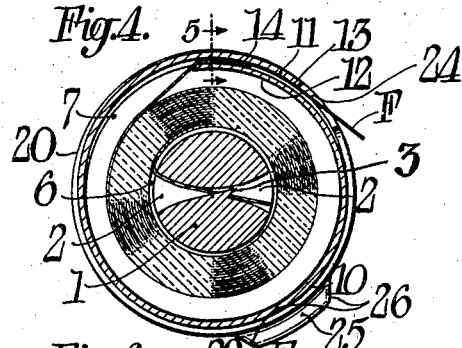
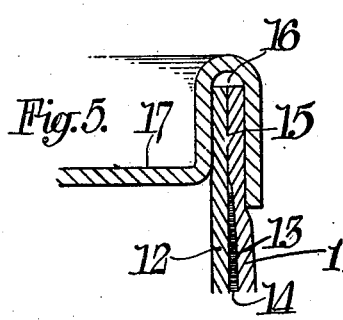
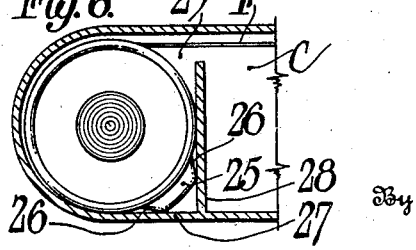
Inventor:
J Henry S. Parker,
Attorneys Patented Oct. 15, 1935

2,017,160

UNITED STATES PATENT OFFICE 2,017,160

LIGHT TIGHT FILM PACKAGE FOR CAMERAS

J Henry S. Parker, Rochester, N. Y., assignor to Eastman Kodak Company, Rochester, N. Y., a corporation of New York Application October 11, 1933, Serial No. 693,131

10 Claims. (Cl. 242—71)

This invention relates to photography and more particularly to light tight film containers adapted to be used in photographic cameras. One object of my invention is to provide an inexpensive film cartridge which will adequately protect lengths of film against light. Another object of my invention is to provide a compact container which can be easily and definitely located in a photographic camera with the spool in position to rotate. Another object of my invention is to provide a container in which a film spool is revolvably mounted and with which the film spool makes light tight connections. Another object of my invention is to provide a means for preventing light from entering a film container and in which the film spool is carried in a definite position. Still another object of my invention is to provide a film package in which a length of film with or without the usual protective leader strip can be wound on a spool and the spool may be rotatably mounted in the container in a position in which the film may be passed to or from the spool through a light tight entrance in the container and other objects will appear from the following specification, the novel features being particularly pointed out in the claims at the end thereof.

Coming now to the drawing wherein like reference characters denote like parts throughout:

Figure 1 is a side elevation of a light tight film package constructed in accordance with and embodying a preferred form of my invention.

Figure 2 is a top plane view of the film container shown in Figure 1.

Figure 3 is an enlarged section on line 3—3 of Figure 2 with a film spool shown in enlargement.

Figure 4 is a section on line 4—4 of Figure 1.

Figure 5 is an enlarged fragmentary detailed section on line 5—5 of Figure 4 showing a portion of the light tight channel leading into the film spool.

Figure 6 is a fragmentary sectional view of a camera with a film package in position therein.

In the drawing of this invention, and particularly in the sectional views of the drawing, the thickness of the material of which the film retort is made has been purposely exaggerated to such an extent that it can be clearly shown. As a matter of fact, the metal cap members are made of quite thin metal and the tubular member supporting the cap members is preferably made of a thin cardlike material which also is much thinner than is indicated by the scale of the drawing.

In some of the new miniature cameras using small size film, such as motion picture film, it is very difficult to make a light tight joint between the film and a spool on which it is wound because of the small dimensions of the spool and particularly because of the small diameter of the film spool flanges. There is very little opportunity with such film cartridges to utilize film backing paper and to protect the film in the customary manner.

In accordance with this invention I have provided a light tight film package or retort in which a spool of film can be mounted so that the film is protected against light at all times.

I prefer to utilize merely a strip of film attached to the film spool and to entirely omit any backing paper, allowing the extreme end of the film to project out of the film package so that it can be drawn out for threading the camera. During the threading operation that part of the film which is drawn from the package is, of course, exposed to light, but because of the construction of my improved package, only the film drawn from the package is fogged.

I prefer to wind the film on a standard type of spool since the film is better protected when wound on a core and when the ends are protected by flanges. Accordingly, I may use a film spool of the type shown in detail in U. S. Patent No. 1,930,144, Maynard D. Lee, issued October 10, 1933.

Such a spool as indicated in Figure 3 may consist of a hub member 1 in which there is a slot 2 which is preferably provided with a hook 3 for engaging an aperture in the end of a film F, all as is fully explained in the above mentioned patent. This spool is preferably provided with a hub in which the hub-ends 4 are of greater diameter than the intermediate portions 5 of the hub, so that the convolutions of film will normally be spaced from the hub a short distance 6, as indicated in Figure 4. This prevents "pressure marks" from occurring where the film is drawn over the edges of the aperture 2 in the hub 1.

At the ends of the hub 1 there are the usual spaced flanges 7 and in the spool shown in this embodiment of my invention there is an extension 8 from the spool projecting beyond flange 7.

In order to make a completely light tight film package from which film may be drawn for exposure and into which the film may be again passed after exposure, I provide a retort which will now be fully described.

The film package preferably consists of a tubular member 10 which may be rolled up out of a sheet of suitable material, such as paper, cardboard, imitation leather or the like, this sheet being rolled up as indicated in Figure 4 with the edges 11 and 12 overlapping so as to form a curved light tight film passage 13, through which a film F can pass. While the curved film passage would be substantially light tight, I prefer to make this entirely light tight by the addition of a strip 14 of soft plush or other pile fabric, this strip lying between the overlapping edges 11 and 12 to form a light tight joint therewith.

The plush or felt 14 is preferably carried by one overlapping edge 11 in a position in which it faces the other overlapping edge 12 so as to substantially close the curved passage through which the film may pass. As indicated in Figure 5, the plush extends over all of the facing area of the overlapping edges 11 and 12 except at the extreme edges 15 where the overlapping ends are pressed into contact with each other. This is done by means of a formed-up groove 16 in the cap members 17 and 18.

As best shown in Figure 3, the tubular member 10 which is more or less flexible is held in its proper shape by means of the cap members 17 and 18 which are alike except that one is a right and the other is a left.

These cap members are preferably made of metal and both have a flat surface 19 which is substantially parallel to the film spool flanges 17 and these flat members terminate in annular flanges 20 which extend down around the outside of the tubular member 10.

Each of these flanges is provided with a groove 16 which is formed-up in the metal, the width of this groove being sufficient to receive the two ends of the overlapping edges 12 and 13 as indicated in Figure 5. Thus the cap members 17 and 18 being rigid form supports for definitely holding the tubular member 10 in place. If desired, the cap members 17 and 18 can be fastened in place. I prefer, for instance, to fasten cap member 18 in place by using an adhesive 21 between the outer surface of the tubular member 10 and the inner surface of the flange 20.

I prefer to attach the cap member 17 to the tubular member 10 by means of a paster 22 which may lie partially over the flange 20 and partially over the tubular member 10. The reason for this is that if a paster with a surgeon's tape adhesive is employed, the cap member 17 can be later removed in case it is desirable to remove the film spool.

The cap members 17 and 18 both are provided with cut-away portions or notches 24 in the flanges 20, these cut-away portions being spaced apart a width greater than the width of the film F, so that the film can pass freely from the curved light tight entrance 13 without touching the metal edges of the caps.

Since the film packages are used directly in a photographic camera, it is necessary to provide a means for properly locating the film package with the curved film entrance slot in the desired position with respect to the exposure frame of the camera. The caps 17 and 18 are provided with a pair of formed-up lugs 25, these lugs as shown in Figures 2 and 6 having tapered end walls 26. These tapered walls are so positioned that when the retort is placed in a camera C the walls 26 engage camera walls 27 and 28 so as to position the retort with the film exit 13 in a position in which the film F may be drawn from the film chamber 29.

It is customary in cameras using small size film to locate a film spool properly in the camera. In accordance with my invention this can be done with the light tight covering in place since there is an aperture 30 in both of the cap members 17 and 18. These apertures permit the usual film spool engaging mechanisms to engage the ends of the film spool hub 1 in a known manner.

In order to prevent light from leaking through the apertures 30 and around the flanges 7 of the film spool, I provide light-excluding members 31, preferably in the form of felt washers which lie between the parallel plates 19 of the caps and the parallel flanges 7 of the film spool. Not only do these light-excluding members engage the parts above described but they likewise engage the inside wall of the tubular member 10.

The film spool 1 is, of course, mounted to rotate in the light tight package, the flanges 7 engaging the walls of the tubular container 10. The relatively slight friction between the film spool and its container is desirable to prevent the film from unwinding too freely.

With a film retort constructed as above described, it is obvious that the film F wound on the film spool is adequately protected against light because there is no possibility of light entering the curved film passage 13 between the overlapping edges 11 and 12 of the tubular member. The plush pad 14 is an additional safeguard against light passing through this passageway. There is also no possibility of light entering the apertures 30 in the cap members 17 and 18 because of the light-excluding material contacting with both the cap members and the film spool flanges.

Consequently, when a film retort of this type is used, it is only necessary to fog a short area of the film which is initially withdrawn from the retort for loading the camera and as soon as the camera is closed the film can be withdrawn across the exposure area for exposure. The film may be wound upon a spool either in or out of a container, such as above described. If the film is wound into a second light tight container the container may be the same as that shown in this application and the rewinding of the film after exposure is avoided.

However, it is customary with most miniature cameras to return the film to its original position, so that after all of the exposures have been made the film is rewound upon the original spool, back through the light tight exit to which it has previously passed for exposure. In either case, with a film retort constructed in accordance with my invention the film is adequately protected against light leak at all times.

What I claim as my invention and desire to be secured by Letters Patent of the United States is:

1. In a light tight film package for cameras, the combination with a film spool, of a container therefor comprising a member of approximately tubular shape, said tube including overlapping edges extending parallel to the tube axis and circular ends, end cap members with openings therein through which said spool is accessible, grooves in the ends of the cap members adapted to receive the ends of the tubular member and the ends of the overlapping edges thereof, and notches in the grooved ends opposite the overlapping edges of the tubular member.

2. In a light tight film package for cameras, the combination with a film spool including flanges, of a container therefor comprising a member of approximately tubular shape, said tube including overlapping longitudinal edges and substantially circular ends, end cap members with openings therein through which said spool is accessible, grooves in the ends of the cap members adapted to receive the ends of the tubular member and the ends of the overlapping edges thereof, a light-excluding washer inside of the grooved end members adapted to contact with the film spool flanges, and notches in the grooved ends opposite the overlapping edges of the tubular member.

3. In a light tight film package for cameras, the combination with a film spool, of a container therefor comprising a member of approximately tubular shape, said tube including overlapping edges extending longitudinally thereof and substantially circular ends, end cap members with openings therein through which said spool is accessible, grooves in the ends of said cap members adapted to receive the ends of the tubular member and the ends of the overlapping edges thereof, a light-excluding covering for an overlapping edge of said tubular member, and notches in the groove ends opposite the overlapping edges of the tubular member.

4. In a light tight film package for cameras, the combination with a flanged film spool, of a container therefor comprising a member of approximately tubular shape, said tube including longitudinally disposed overlapping edges extending to the substantially circular ends of the tubular member, end cap members with openings therein through which said spool is accessible, grooves in the ends adapted to receive the ends of the tubular member and the ends of the overlapping edges thereof, light-excluding washers inside of the groove end members adapted to contact with the end members, the film spool flanges and the tubular member with overlapping edges to form a light tight connection therewith.

5. In a light tight film package, the combination with a flanged film spool, of a container for the film spool including a cardboard tubular member having overlapping edges forming a curved film passageway, flanged caps on the ends of the tubular members, said flanged caps including apertures in the ends and grooves extending around the peripheries of the flanges of a width adapted to receive the two ends of the overlapping edges of the tubular member, light excluding material carried by one overlapping edge facing the other overlapping edge and extending across that portion of the curved film passageway which is out of engagement with the cap grooves, and light-excluding washers between the spool flanges and apertured caps.

6. In a light tight film package, the combination with a flanged film spool, of film wound on the spool, with a light tight container, said container comprising a tubular cardboard member having overlapping edges forming a curved film guideway, metallic caps apertured in the center, said caps including grooves extending around their peripheries for holding the ends of the tubular members together, means for preventing light from entering the curved film guideway including light-excluding material between the overlapping edges of the tubular member, and means for preventing light from entering between the spool flanges and end caps comprising light-excluding material surrounding the apertures of the caps and lying between the caps and spool flanges.

7. In a light tight film package, the combination with a flanged film spool, of a container therefor including a tubular member having overlapping edges with a curved slot therebetween, of end cap members including grooves adapted to receive the ends of said tubular member and constituting a means for holding the edges of the overlapping end of the tubular member together, said end members including openings through which said spool is accessible and soft-light-excluding disks mounted between the spool flanges and the end caps to prevent light from entering between said caps and flanges.

8. In a light tight package of film, the combination with a flanged spool, of an enclosure therefor including a flexible tubular member having overlapping edges forming a curved film guideway, the diameter of said tube being substantially the same as the spool flanges and being adapted to contact therewith, perforated caps on the ends of the tubular member adapted to engage the ends of the flexible tubular member and hold the same in shape, and means between the perforated caps and spool flanges for preventing light from leaking through the perforations and around the flanges.

9. In a light tight package of film, the combination with a flanged film spool, of an enclosure therefor in which the spool is revolvably mounted and including a flexible tubular member having overlapping edges forming a curved film guideway, the diameter of said tube being substantially the same as the spool flanges and being adapted to contact with and form bearings for the spool flanges, perforated caps on the ends of the tubular member adapted to engage the ends of the flexible tubular member and hold them in shape, and means between the perforated caps and the spool flanges for preventing light from leaking through the perforations and around the film spool flanges.

10. In a light tight package of film, the combination with a flanged spool, of an enclosure therefor including a flexible tubular member having overlapping edges forming a curved film guideway, the diameter of said tube being substantially the same as the spool flanges and being adapted to contact therewith, perforated caps on the ends of the tubular member adapted to engage the ends of the flexible tubular member and to hold the same in shape, said perforated caps including ends parallel to the flanges of the film spool, and means between the parallel parts of the perforated cap and the film spool flanges for preventing light from leaking through the perforations and around the film spool flanges.

J HENRY S. PARKER.